United States Patent [19]

Oikawa

[11] Patent Number: 4,916,650

[45] Date of Patent: Apr. 10, 1990

[54] SENSOR SIGNAL INTEGRATING METHOD

[75] Inventor: Takahiro Oikawa, Shizuoka, Japan

[73] Assignee: Yazaki Corporation, Japan

[21] Appl. No.: 157,949

[22] Filed: Feb. 19, 1988

[51] Int. Cl.$^4$ .......................... G06F 7/38; G06F 15/50
[52] U.S. Cl. ...................................... 364/733; 364/453
[58] Field of Search ............... 364/733, 721, 443, 453, 364/454; 73/504

[56] References Cited

U.S. PATENT DOCUMENTS

| | | | |
|---|---|---|---|
| 3,925,643 | 12/1975 | Roantree et al. | 364/721 X |
| 4,409,836 | 10/1983 | Comroe et al. | 73/504 |
| 4,470,119 | 9/1984 | Hasebe et al. | 364/454 |
| 4,713,767 | 12/1987 | Sato et al. | 364/453 |

FOREIGN PATENT DOCUMENTS 0161049  3/1985  European Pat. Off. .

OTHER PUBLICATIONS

Patents Abstracts of Japan, P-537, Jan. 20, 1987, vol. 1/No. 19.

Primary Examiner—David H. Malzahn
Attorney, Agent, or Firm—Wigman & Cohen

[57] ABSTRACT

To eliminate the harmful influence of drift when integrating a sensor signal, the sensor signal is integrated from a time point a first predetermined time period before the sensor signal level becomes higher than the perdetermined signal level to a time point a second predetermined time period after the sensor signal level becomes lower than the predetermined signal level.

3 Claims, 4 Drawing Sheets

SENSOR SIGNAL INTEGRATING METHOD

BACKGROUND OF THE INVENTION

1. Field of the Invention

The present invention relates generally to a sensor signal integrating method and more specifically to a method of detecting angles by integrating angular rate signals generated from an angular rate sensor.

2. Description of the Prior Art

The background of the present invention will be explained with respect to its application to an angular rate sensor incorporated with a navigation system for an automotive vehicle.

Recently, a navigation system using an angular rate sensor has been put into practical use for an automotive vehicle. In this system, automotive vehicle travel locations are detected by an angular rate sensor and a distance sensor, and the detected vehicle locations are projected on a displayed map road so that the vehicle travel route is displayed along predetermined roads on the map. Since this system can be operative independently without need of other auxiliary means (e.g. radio signals), this system is effective in an urban area or other area subjected to radio interference where radio navigation systems cannot operate reliably.

FIG. 1 shows a block diagram of the navigation system using an angular rate sensor, in which the system comprises a distance sensor 1 for detecting vehicle travel distance and outputting a distance signal corresponding thereto; an angular rate (velocity) sensor 2 for detecting vehicle travel angular rate and outputting an angular rate signal corresponding thereto; a controller 3 (e.g. CPU) for calculating vehicle locations on the basis of the distance signals and angular rate signals; a memory unit 4 for storing various map data including branch points; a display unit 5 such as a CRT for displaying a road map and a vehicle travel location trace; and a keyboard 6 for entering data such as a start point on a road map.

The above controller 3 calculates vehicle travel angle on the basis of angular rate sensor signals as follows:

Assumption is made that an automotive vehicle turns to the right for a time period $t_1$, goes straight ahead, and then turns to the left for a time period $t_2$, as shown in FIG. 3(A). In this case, the angular rate sensor 2 generates two angular rate sensor signals $f_1(T)$ and $f_2(T)$ The controller 3 calculates a right-turn angle $A_R$ and a left-turn angle $A_L$ by obtaining areas $S_1$ and $S_2$ in accordance with the following expressions:

$$A_R = S_1 = \int_0^{t_1} f_1(T) \, dT$$

$$A_L = S_2 = \int_0^{t_2} f_2(T) \, dT.$$

FIG. 3(A) shows an example of an angular rate sensor signal in ideal form without being subjected to the harmful influence of drift in the output voltage level of the angular rate sensor 2. In practice, however, since drift is inevitably superimposed upon the output of the angular rate sensor 2 due to disturbance, the angular rate sensor signal shown in FIG. 3(A) changes to that shown in FIG. 3(B). In FIG. 3(B), the drift $V_0(T)$ is approximate by a straight line $\alpha T$ for simplicity.

When an angular rate sensor signal on which drift is superimposed is integrated to obtain an angle, the area dotted in FIG. 3(B) causes an error.

In more detail, the area $S_1$ shown in FIG. 3(A) changes to an area $S_1'$ enclosed by curves a, $P_1$, b, c, d and A, so that area enclosed by a, b, c, d and A is added to the area $S_1$ as an error. On the other hand, the area $S_2$ shown in FIG. 3(A) changes to an area $S_2'$ enclosed by curves d, e and $P_2$, so that an area enclosed by c, f, e and d is subtracted from the area $S_2$ as an error.

Therefore, an actual vehicle travel route as shown by B in FIG. 2 is dislocated from the route B to an erroneous route A beyond an allowable range C shown by two dashed curves in FIG. 2 in a short period of time D. Once the calculated vehicle location deviates from the allowable range, the driver is required to manually reset or correct the current erroneous displayed location to a road displayed on the map to continue the normal display operation of the navigation system.

In other words, in the prior-art navigation system, when the output level of the angular rate sensor drifts or fluctuates, there exists a problem in that the driver often resets the erroneous displays by actuating a certain button, for instance.

Of course, it may be possible to solve the above-mentioned problem by using a high precision angular rate sensor to a certain extent. However, this results in another problem such that the sensor cost is extraordinarily high.

SUMMARY OF THE INVENTION

With these problems in mind, therefore, it is the primary object of the present invention to provide a method of integrating a sensor signal which can reduce error caused by drift superimposed upon the sensor signal.

To achieve the above-mentioned object, the method of integrating a sensor signal according to the present invention comprises the following steps of: (a) generating a sensor signal; (b) presetting a predetermined signal level; (c) comparing the generated sensor signal with the preset predetermined signal level to generate an integration signal when the generated sensor signal exceeds the preset signal level; (d) inverting the integration signal; (e) delaying the generated sensor signal by a first time period; (f) delaying the inverted integration signal by a second time period; and (g) integrating the delayed sensor signal from when the integration signal is generated to when the delayed inverted integration signal is generated.

In the method of the present invention, a sensor signal is integrated from a time point a first predetermined time period before the sensor signal level exceeds a predetermined signal level to a time point a second predetermined time period after the sensor signal level drops below the predetermined signal level. In other words, since a drift level sandwiched between two adjacent sensor signals is not substantially integrated, it is possible to reduce an integration error due to drift to that extent.

BRIEF DESCRIPTION OF THE DRAWINGS

The features and advantages of the sensor signal integrating method according to the present invention will be more clearly appreciated from the following description of the preferred embodiment of the invention taken in conjunction with the accompanying drawings.

DETAILED DESCRIPTION OF THE PREFERRED EMBODIMENTS

The method of integrating a sensor signal generated from an angular rate sensor according to the present invention will be described hereinbelow with reference to the attached drawings.

Figure 4A:
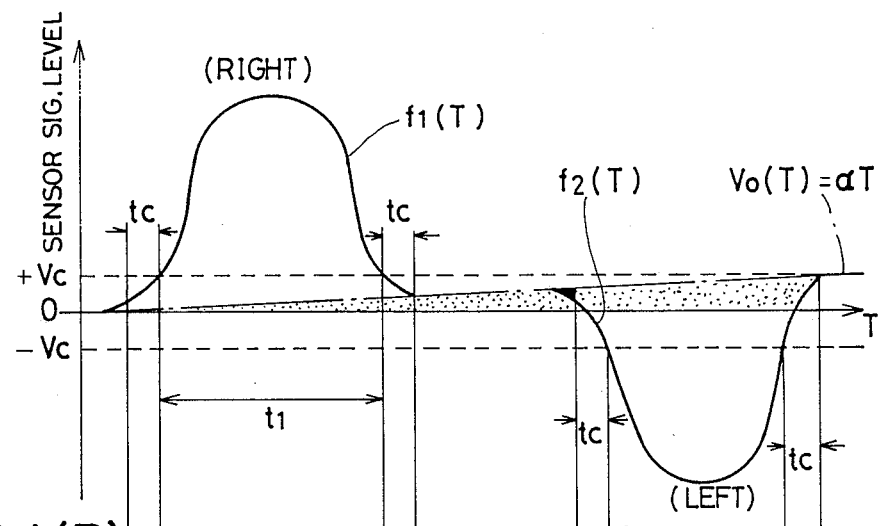
FIGS. 4(A) and 4(B) show similar graphical representations showing an example of sensor signal including drift, for assistance in explaining the sensor signal integrating method according to the present invention.

In FIG. 4(A), $f_1(T)$ is a sensor signal generated from an angular rate sensor when the vehicle turns to the right, for instance; while $f_2(T)$ is a sensor signal generated from an angular rate sensor when the vehicle turns to the left. In FIG. 4(A), a drift level generated by disturbance is approximated by $V_0(T)=\alpha T$ and is superimposed upon the two angular rate sensor signals. Further, two voltage levels $+Vc$ and $-Vc$ are predetermined to check whether the level of the angular rate sensor signal including drift exceeds these two voltage levels $|Vc|$.

A time period $t_1$ during which the angular rate sensor signal $f_1(T)$ exceeds a level $+Vc$ and a time period $t_2$ during which the angular rate sensor signal $f_2(T)$ drops below a level $-Vc$ are both detected by obtaining the intersections of the angular rate sensor signal $f_1(T)$ or $f_2(T)$ and the predetermined levels $|Vc|$. Further, a predetermined fixed time $2t_c$ is added to the above time period $t_1$ to $t_2$ on both the sides of the sensor signal, respectively to determine two integrating time periods $(t_1+2t_c)$ or $(t_2+2t_c)$ Therefore, the right-turn angular rate sensor signal $f_1(T)$ is integrated during a time period $(t_1+2t_c)$ to obtain an areas $S_1''$ as shown by shaded portion in FIG. 4(B); while the left-turn angular rate sensor signal $f_2(T)$ is integrated during a time period $(t_2+2t_c)$ to obtain an area $S_2''$ as shown by shaded portion in FIG. 4(B).

Figure 3A:
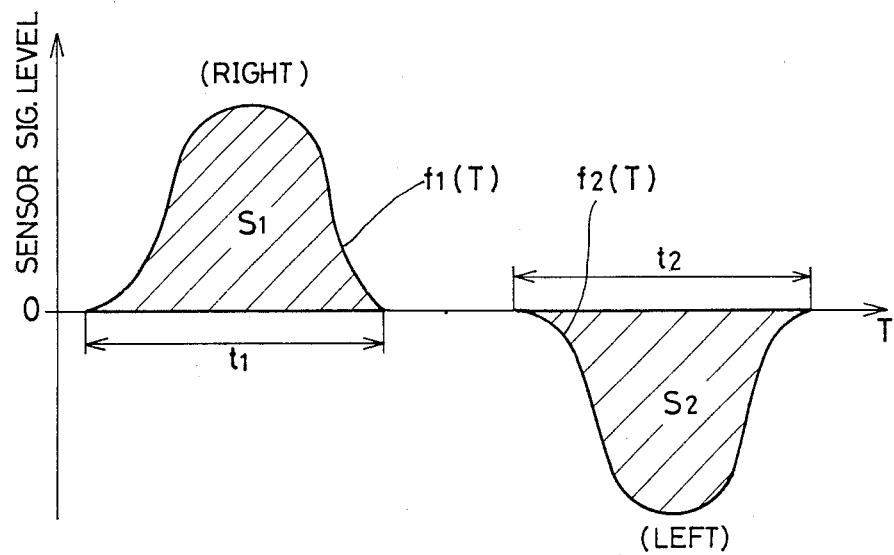
FIG. 3(A) is a graphic representation showing an example of angular rate sensor signal including no drift.
Figure 3B:
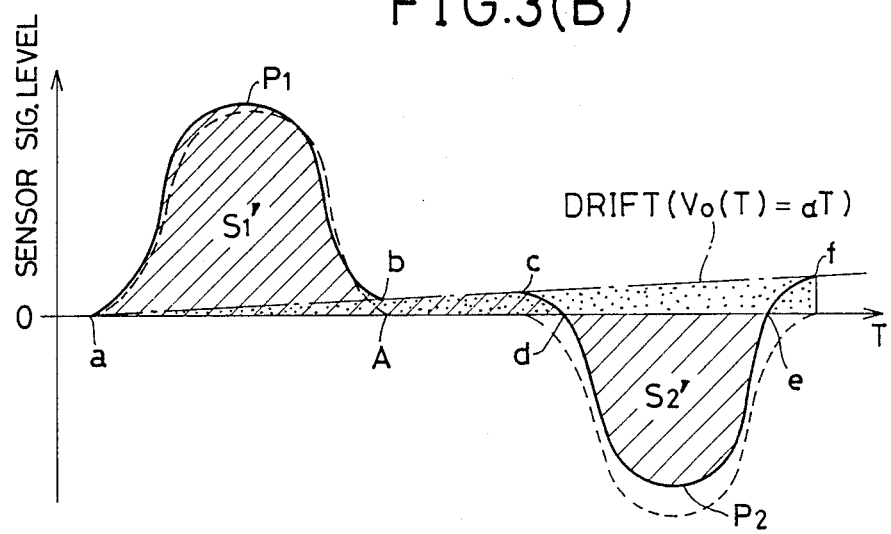
FIG. 3(B) is a graphic representation showing the same angular rate sensor signal including drift, for assistance in explaining the prior-art sensor signal detecting method.
Figure 4B:
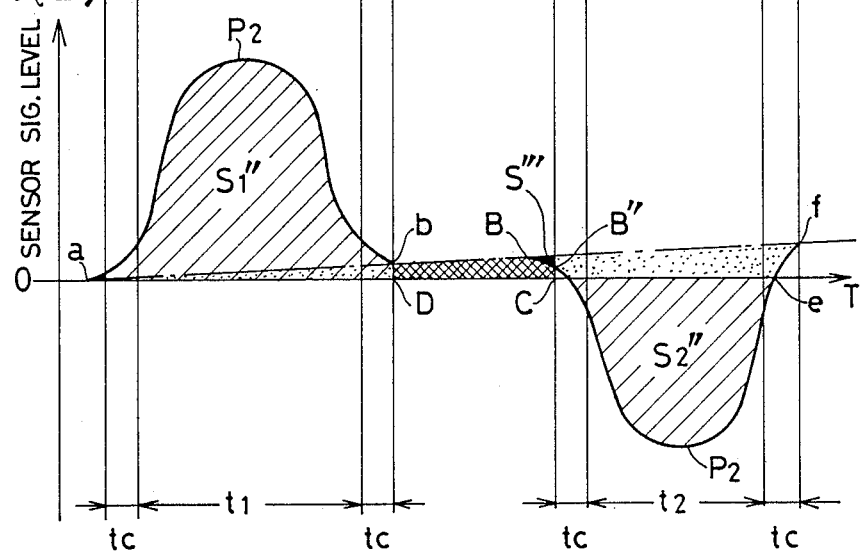

In FIG. 4(B), it is well understood that an erroneous area enclosed by b, B, C and D and shown by cross shaded portion in FIG. 4(B), can be reduced from the prior-art area $S_1'$ shown in FIG. 3(B). This is because drift existing between the two right- and left-turn signals and detected by a check level $|Vc|$ will not be integrated, thus improving the precision of an integrated value of the angular rate sensor signal.

In this embodiment, an erroneous area enclosed by B, f, e and C is not added to an area $S_2''$ as shown in FIG. 4(B). However, when the polarity of the angular rate sensor signal is different between after the signal has exceeded $|Vc|$ the time $t_c$, it is possible to shift this area $S_2'''$ (shown black in FIG. 4(B)) and thereafter to add this area to the area $S_2''$ to reduce an error.

Further, since the output level of the sensor signal drifts in either direction as expressed by $V_0(T)\pm\alpha T$, perfect elimination of erroneous area is not necessarily required.

Figure 2:
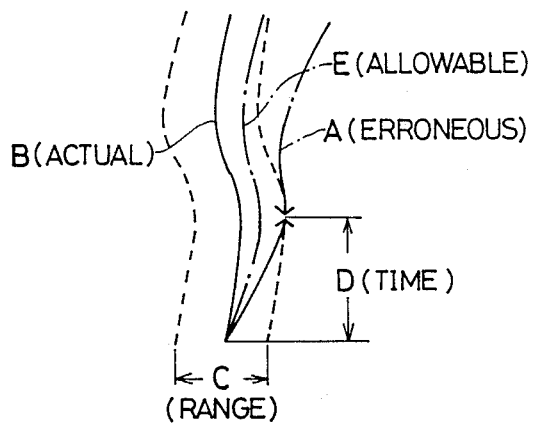
FIG. 2, is a diagram for assistance in explaining vehicle travel routes calculated by the navigation system shown in FIG. 1.

In the method of the present invention, since error of the detected vehicle travel angle can be relatively reduced, the vehicle travel route can trace within an allowable range C as shown by E in FIG. 2. Therefore, the navigation system using the method of the present invention can display the vehicle travel locations within an allowable range for many hours without troublesome operation of display position correction.

Figure 1:
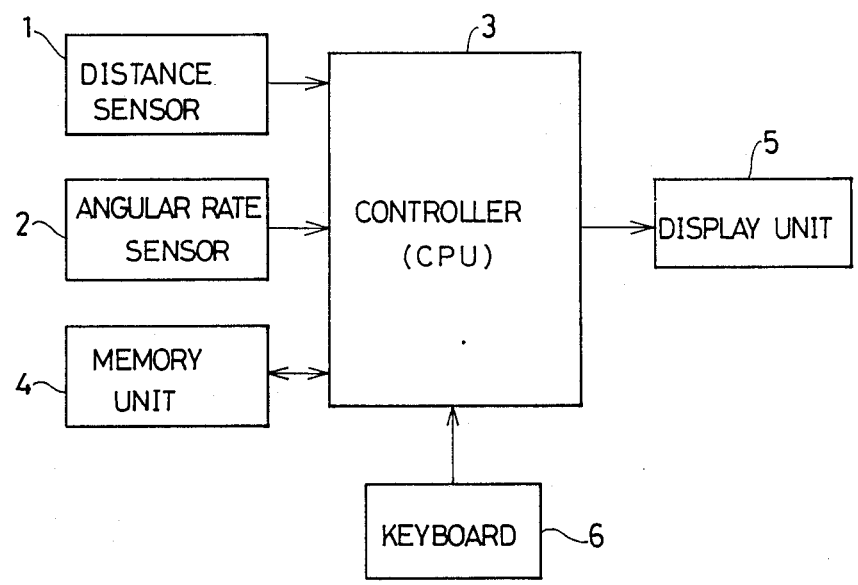
FIG. 1 is a block diagram showing a navigation system using an angular rate sensor, to which the sensor signal integrating method of the present invention is applied by way of example.
Figure 5:
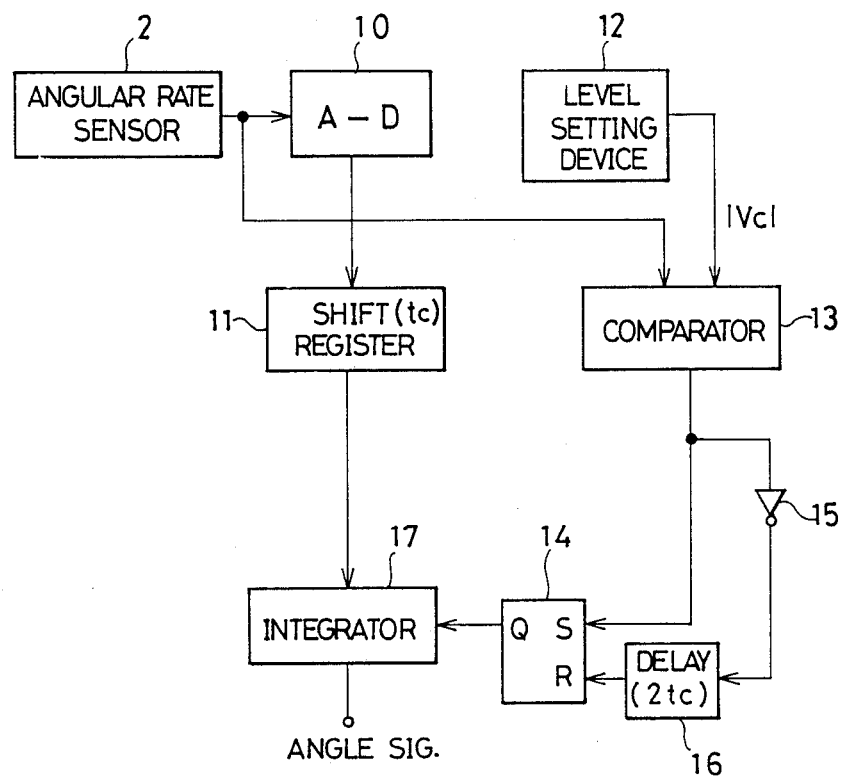
FIG. 5 is a block diagram for embodying the sensor signal integrating method disclosed with reference to FIGS. 4(A) and 4(B).

FIG. 5 is a block diagram showing an embodiment of the apparatus which can implement the method of the present invention. The apparatus comprises an angular rate sensor 2 as shown in FIG. 1; an A-D converter 10 for sampling an angular rate sensor signal at an appropriate sampling frequency, quantizing the sampled signal into digital signals having quantized signal levels; a shift register 11 for temporarily storing digitalized angular rate signal in sequence and outputting the stored signals after a time $t_c$ (serving as a delaying circuit); a predetermined level presetting device 12 for setting a voltage level $|Vc|$; a comparator 13 (e.g. window comparator) for comparing the analog angular rate sensor signal with the preset voltage level $|Vc|$ and outputting a high-voltage-level signal when the angular rate signal exceeds $|Vc|$ and a low-voltage-level signal when the signal drops below $|Vc|$; a R-S flip-flop 14 having a set input terminal S connected to the comparator 13 and a reset input terminal R connected to the comparator 13 via a delay circuit 16 and an inverter 15; and an integrator 17 for integrating the digital angular rate sensor signals delayed by $t_c$ through the shift register 11 in sequence in response to an H-level signal from the Q-output terminal of the flip-flop 14. The above integration operation is stopped in response to an L-level signal from the Q-output terminal thereof.

The operation of the circuit shown in FIG. 5 will be described hereinbelow.

An angular rate sensor signal detected by the angular rate sensor 2 is digitalized through the A-D converter 10 and shifted by the shift register 11 to delay the digital signal by a delay time $t_c$.

When the level of the angular rate sensor signal exceeds $|Vc|$, the output of the comparator 13 changes from L to H to set the R-S flip-flop 14, so that the Q output changes from L to H. In response to this H-level signal, the integrator 17 starts to integrate the digital sensor signals outputted from the shift register 11. Since the digital signals are delayed by $t_c$ through the shift register 11, the integrator 17 integrates the angular rate sensor signals beginning from a time $t_c$ before the angular rate sensor signal level exceeds $|Vc|$.

On the other hand, when the angular rate sensor signal level drops below $|Vc|$, since the output of the comparator 13 changes from H to L level, so that the output of the inverter 15 changes from L to H level. In response to this H level signal, the output of the delay circuit 16 changes from L to H level after $2t_c$. In response to this delayed signal, since the R-S flip-flop 14 is reset, the Q output thereof changes from H to L level, so that the integrator 17 stops integrating. As described above, the angular rate sensor signal is integrated from a first time $t_c$ before the signal exceeds $|Vc|$ to a second time $t_c$ after the signal drops below $|Vc|$.

As described above, in the sensor signal integrating method of the present invention, angular rate sensor signals whose level is less than a predetermined level $|Vc|$ is regarded as drift and not integrated between two adjacent sensor signals, it is possible to reduce error due to drift. Therefore, when applied to a navigation system using a relatively low-priced angular rate sensor for an automotive vehicle, for instance, it is possible to reliably display vehicle travel locations without correcting or resetting the displayed locations on the map road.

What is claimed is:

1. A method of integrating a sensor signal superimposed upon a drift with respect to time on the basis of a zero sensor signal level, said method comprising the following steps of:
   (a) generating a positive sensor signal $f_1(T)$ and a negative sensor signal $f_2(T)$ from a sensor;
   (b) presetting a positive predetermined constant signal level $+Vc$ and a negative predetermined constant signal level $-vc$;
   (c) counting a predetermined constant time period $t_c$; and
   (d) integrating the sensor signal $f_1(T)$ from a time point a, which is the predetermined time period tc before a level of the generated sensor signal becomes higher than the preset signal level $+vc$, to a time point b, which is the predetermined time period tc after the level of the generated sensor signal becomes lower than the preset signal level $+Vc$, and integrating the sensor signal $f_2(T)$ from a time point c, which is the predetermined time period tc before the level of the generated sensor signal becomes lower than the preset signal level $-Vc$, to a time point f, which is the predetermined time period tc after the level of the generated sensor signal becomes higher than the preset signal level $-Vc$.

2. A method of integrating a sensor signal $f(T)$ superimposed upon a drift with respect to time, said method comprising the following steps of:
   (a) shifting the sensor signal $f(T)$ by a predetermined positive constant time period $t_c$;
   (b) presetting a predetermined constant signal level vc;
   (c) comparing the sensor signal with the preset predetermined signal level and generating a first signal when the sensor signal exceeds the predetermined signal level and generating a second signal when the sensor signal drops below the predetermined signal level;
   (d) inverting voltage levels of the first and second signals;
   (e) delaying the inverted first and second signals by a second time period $2.t_c$;
   (f) generating an integration start signal in response to the first and second signals and an integration end signal in response to the inverted and delayed first and second signals; and
   (g) integrating the shifted sensor signal from when the integration start signal is generated to when the integration end signal is generated.

3. An apparatus for integrating an input sensor signal $f(T)$ superimposed upon a drift with respect to time, said apparatus comprising:
   (a) means (11), responsive to the input sensor signal $f(T)$, for shifting the input sensor signal by a first time period $t_c$;
   (b) means (12) for presetting a predetermined constant signal level Vc;
   (c) means (13) responsive to the input sensor signal and coupled to said predetermined signal level presetting means for comparing the input sensor signal with preset predetermined signal level Vc and generating a first signal when the sensor signal exceeds the predetermined constant signal level vc and generating a second signal when the sensor signal drops below the predetermined signal level;
   (d) means (15) coupled to said comparing means for inverting voltage levels of the first and second signals;
   (e) means (16) coupled to said inverting means for delaying the inverted first and second signals by a second time period $2.t_c$;
   (f) means (14) coupled to said comparing means and said delaying means for generating an integration start signal in response to the first and second signals generated from said comparing means and an integration end signal in response to the inverted and delayed first and second signals generated from said delaying means; and
   (g) means (17) coupled to said shifting means and said integration start and end signal generating means for integrating the shifted sensor signal from when the integration start signal is generated to when the integration end signal is generated, and outputting an integrated signal.

* * * * *

UNITED STATES PATENT AND TRADEMARK OFFICE
CERTIFICATE OF CORRECTION

PATENT NO. : 4,916,650

DATED : April 10, 1990

INVENTOR(S) : Takahiro OIKAWA

It is certified that error appears in the above-indentified patent and that said Letters Patent is hereby corrected as shown below:

Column 1, line 48, after "$f_2(T)$" insert --.--.

Column 3, line 49 after "$(t_2+2t_c)$" insert --.--;

Column 4, line 4, "$V_0(T)\pm\alpha T,$" should be --$V_0(T) = \pm\alpha T,$--.

Claim 1, column 5, line 27, "+vc," should be --+Vc,--.

Claim 3, column 6, line 25, after "with" insert --the--;
line 27, "vc" should be --Vc--.

Signed and Sealed this

Thirteenth Day of September, 1994

BRUCE LEHMAN

Attest:

Attesting Officer

Commissioner of Patents and Trademarks

UNITED STATES PATENT AND TRADEMARK OFFICE
CERTIFICATE OF CORRECTION

PATENT : 4,916,650

DATED : April 10, 1990

INVENTOR(S) : Takahiro Oikawa

It is certified that error appears in the above-identified patent and that said Letters Patent is hereby corrected as shown below:

Column 3, line 68 after "|Vc|", insert -- and before--.

Signed and Sealed this

Eleventh Day of October, 1994

Attest:

BRUCE LEHMAN

Attesting Officer     Commissioner of Patents and Trademarks